(12) United States Patent
Engelmann et al.

(10) Patent No.: US 6,400,041 B1
(45) Date of Patent: Jun. 4, 2002

(54) DEVICE FOR INTERLOCKING THE STEERING COLUMN OF AN AUTOMOTIVE STEERING MECHANISM

(75) Inventors: Joachim Engelmann, Ratingen; Peter Andreas Gratzl, Erdweg; Hagen Friedrich, Markt Indersdorf, all of (DE)

(73) Assignee: Valeo Deutschland & Co. Sicherheitssysteme, Erdweg (DE)

( * ) Notice: Subject to any disclaimer, the term of this patent is extended or adjusted under 35 U.S.C. 154(b) by 0 days.

(21) Appl. No.: 09/580,249

(22) Filed: May 26, 2000

(30) Foreign Application Priority Data

May 29, 1999 (DE) .......................................... 199 24 835

(51) Int. Cl.[7] .............................................. B60R 25/02
(52) U.S. Cl. ...................................................... 307/10.2
(58) Field of Search ................................ 307/10.2, 10.5

(56) References Cited

U.S. PATENT DOCUMENTS 4,638,882 A * 1/1987 Sato ........................ 307/10 AT

FOREIGN PATENT DOCUMENTS

| DE | 197 37 856 A1 | 3/1999 |
| DE | 198 09 295 C1 | 5/1999 |
| DE | 199 06 267 A1 | 8/2000 |
| EP | 846 602 A2 | 6/1998 |
| EP | 1 029 754 A2 | 8/2000 |

* cited by examiner

Primary Examiner—Fritz Fleming
(74) Attorney, Agent, or Firm—Morgan & Finnegan, LLP

(57) ABSTRACT

The invention relates to a device for locking the steering column of a motor vehicle steering mechanism, with a locking device arranged within the zone of the steering column, and with a central controller electrically connected to said locking device, whereby the locking device comprises an electrical setting member for displacing a slidably arranged locking element from its unlocking into its locking position, and a sensor for monitoring a predetermineable condition of the locking device. In order to make it possible for the condition of the locking device to be monitored by means of the sensor also while the motor vehicle is driving, without causing thereby any increase of the safety risk, the invention proposes that the sensor be connected to the central controller in such a way that if the supply voltage for the locking device is switched off, the central controller is capable of scanning and evaluating the condition of the locking device detected by the sensor.

5 Claims, 1 Drawing Sheet

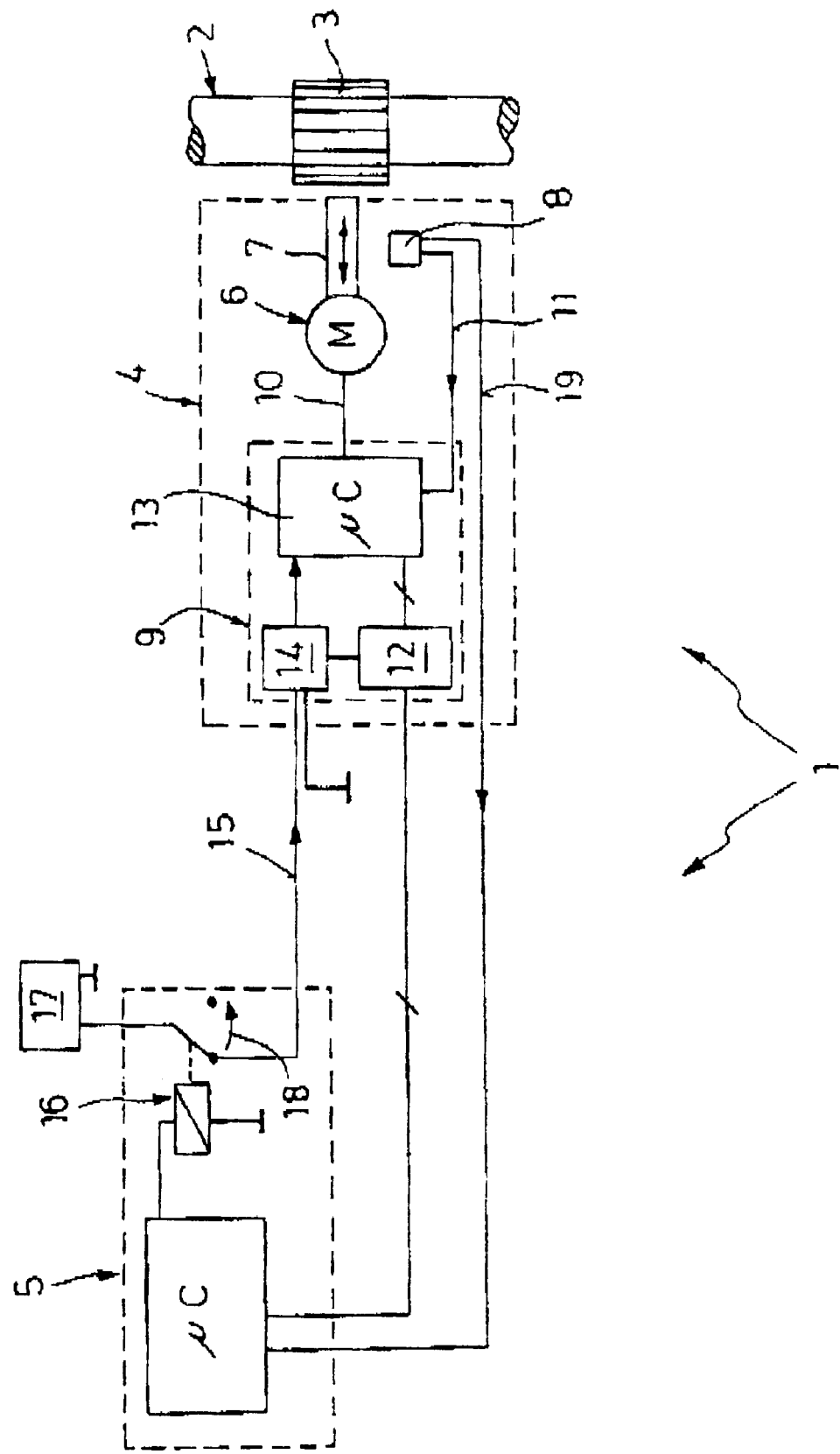

DEVICE FOR INTERLOCKING THE STEERING COLUMN OF AN AUTOMOTIVE STEERING MECHANISM

BACKGROUND OF THE INVENTION

The invention relates to a device for locking the steering column of a motor vehicle steering mechanism, with a locking device arranged within the zone of the steering column, and a central controller electrically connected to said locking device.

Such a device is described, for example in German patent application No. 199 06 267.6, which has not been published on an earlier date. The locking device described in said application comprises an electric servo-drive for displacing a locking element from its locking into its unlocking position, and vice versa, as well as a sensor for monitoring the position of the locking element or of a safety element securing said locking element. In the locking position, the locking element engages the recess of a toothed rim secured on the steering column, said recess being formed by adjacent teeth, and blocks the steering column in that way.

The locking device described in patent application 199 06 267.6 has an electronic circuit device both for controlling the servo-drive and evaluating the measuring signals generated by the sensor, said circuit being connected to the central controller of the motor vehicle via electrical cables. No details are specified in said application with respect to any control of the locking device with the help of the central controller. It was found to be advantageous in practical life if, while the motor vehicle is moving, the safety element is retained not only in its unlocking position, for example by a spring-actuated safety element, but if the supply voltage of the locking device is additionally switched off by means of the central controller. This assures that the locking element cannot be displaced in any safety-critical direction by the electrically driven setting member (e.g. an electric motor) in the presence of an electrical malfunction.

It was found that it is a drawback with such an electrical shutdown of the locking device that the changes in conditions which the sensor is expected to monitor such as, for example, occurrence of breakage of the housing or breakage of the spring in the spring actuated safety element (or also manipulation on the locking device), cannot be detected while the motor vehicle is moving. This may under certain circumstances lead to dangerous situations for the driver of the vehicle.

Furthermore, a device for locking the steering column of the steering mechanisms of a motor vehicle is known from DE 198 09 295 C1, which comprises a locking bar that is displaceable by an electrical setting member. So as to be able to assure that the unlocking and locking positions of the locking bar can be detected with very high accuracy in a simple manner, the invention proposes that use be made of at least two independently operating sensors which are electrically connected to an electronic circuit device acting on the setting member. The first sensor detects in this connection the position of a safety element, which engages a recess of the locking bar. The second sensor is directly associated with the locking bar and always responds to an element arranged on the locking bar in such a way as to be detected when the locking bar is in its locking position.

A theft protection system for motor vehicles is known from DE 197 37 856 A1 which has one single controlling unit on the side of the lock. Together with a steering lock system said controlling unit is arranged in a safety housing near the steering wheel. The controlling unit unlocks the steering locking system and releases the drive-away blockage if authorization has been successfully verified by a code signal transmitter.

Finally, a device for locking the steering column of a motor vehicle steering mechanism is known from EP 846 602 A2, where the position of a safety element is detected by means of a switch, said safety element securing the locking bar in the unlocking position, whereby the latter can be swiveled by an electrical setting member. Both the switch and the setting member are connected to an electronic circuit device via electrical cables.

BRIEF DESCRIPTION OF THE INVENTION

The invention is based on the problem of proposing a device of the type specified above, by means of which the monitoring of the condition with the sensor arranged in the locking device is possible also while the vehicle is in motion without causing thereby any increase in the safety risk for the driver of the vehicle.

The problem is solved according to the invention by the features of the claims, and particularly advantageous features of the invention are discloded in the dependent claims.

The invention is substantially based on the idea that the sensor is connected not only to the electronic circuit of the locking device, but additionally also to the central controller, in a way such that even if the supply voltage for the locking device is switched off, the controller is still capable of scanning and evaluating the status of the locking device detected by the sensor.

The sensor is advantageously a position sensor (e.g. a Hall sensor) that monitors the position of the locking element and/or of a safety element securing said locking element.

The electrical setting member may be both an electric motor with gearing connected downstream, or a lifting magnet that is connected with the locking element, or whose displaceable tappet forms the locking element.

A further benefit of using such a status sensor that is additionally connectable also to the central controller is that the function of the locking device can be tested in a simple way. For this purpose, test signals are generated by means of the central controller and transmitted to the status sensor by way of the additional line (for example, if a Hall sensor is employed, a defined current is adjusted, or the supply current of the Hall sensor is switched off). Such artificially generated sensor signals are subsequently evaluated by the electronic circuit of the locking device or by the central controller connected downstream (test loop).

DETAILED DESCRIPTION OF THE INVENTION

Further details and advantages of the invention are disclosed in the description of the exemplified embodiment which is explained in the following with the help of one FIGURE.

In the FIGURE, reference numeral 1 denotes a device as defined by the invention for locking the steering column 2 of a motor vehicle steering mechanisms not shown in detail. The steering column 2 supports a toothed rim 3. The device 1 comprises a locking device 4 arranged within the zone of the steering column 2, and a central controller 5 which is electrically connected to said locking device but spaced away from the latter.

The locking device 4 substantially consists of an electrical setting member 6 for displacing a slidably arranged locking element 7 from its unlocking position into its locking position; a position sensor 8 (e.g. a Hall sensor) for monitoring the position of the locking element 7; and an electronic circuit device 9 which is connected to both the electrical setting member 6 and the position sensor 8 via the electrical cables 10, 11. The electrical setting member 6 is an electric motor with a gearing downstream.

The electronic circuit device 9 comprises an interface card 12, which is connected to the setting member by way of a microcontroller 13. Said microcontroller 13 generates on the basis of the coded signals transmitted by the central controller 5 not only the control signals for the electric motor of the setting member 6, but also processes the signals received from the position sensor 8.

Furthermore, the electronic circuit device 9 contains a current supply unit 14, which supplies the subassemblies 12 and 13 with current, and which in turn is supplied with current via an electric cable 15 and a switching element (relay) 16 associated with the central controller 5 by the battery 17 or an emergency battery of the vehicle. As soon as the locking element is located in its unlocking position as shown in the FIGURE, in which the locking element 7 no longer is engaged between the teeth of the toothed rim 3 of the steering column, and the engine of the vehicle is started with the ignition key (not shown), the central controller 5 causes the switching element 16 to reverse to the position indicated by the arrow 18. The locking device 4 is then switched to "power off" and no current can be supplied to the electric motor of the setting member 6 even in the presence of a switching malfunction within the locking device 4, and the locking element 7, therefore, can not be shifted into its locking position.

The position sensor 8 arranged in the locking device 4 is directly connected to the central controller 5 via a second electrical line 19. Therefore, when the supply voltage of the locking device 4 is switched off, it is possible to continue to monitor the position of the locking element 7 with the central controller 5.

If, for example, even only a minor displacement of the locking element should occur, for example due to any mechanical influence (breakage of the housing; failure of the spring of a safety element securing the locking element, etc.), a suitable warning light or warning sound can alert the driver to stop the vehicle immediately.

If a Hall sensor 8 is employed as the position sensor, current supplied by the central controller 5 flows through said sensor as well; however, said current is so weak that in the event any switching error or malfunction should occur within the locking device 4, actuation of the electric motor by such current is safely excluded.

The invention is, of course, not limited to the exemplified embodiment described above. For example, the sensor can be arranged in the locking device in such a way that it does not directly monitor the position of the locking element but rather the position of an auxiliary element securing the position of the locking element in its unlocking position. Furthermore, it is possible also to arrange a plurality of sensors within the locking device for monitoring a number of conditions of the locking device that can be preset, whereby such sensors are in turn additionally monitored by the central controller.

List of Reference Numerals

1 Device
2 Steering column
3 Toothed rim
4 Locking device
5 Controller
6 Setting member
7 Locking element
8 Sensor, position sensor, Hall sensor
9 Circuit
10,11 Electric lines (cables)
12 Interface card, subassembly
13 Microcontroller, subassembly
14 Current supply unit
15 Electrical line
16 Switching element
17 Vehicle battery
18 Arrow
19 Second electrical line

What is claimed is:

1. A motor vehicle steering column lock assembly comprising:

a locking member having an electrical setting member for displacing a slidably arranged locking element from an unlocking position into a locking position;

at least one sensor for monitoring a predetermineable condition of the locking member;

an electronic circuit member which is electrically connected to both the setting member and the sensor;

a central controller having a switching element by means of which the supply voltage of the locking member can be switched on and off, in a way such that no supply voltage is applied during driving of the respective vehicle to the locking member that is sufficient for operating the electrical setting member and the circuit member;

the sensor being connected to the central controller in such a way that when the supply voltage of the locking member is switched off, the controller is capable of scanning and evaluating the condition of the locking member detected by the sensor.

2. The assembly according to claim 1, wherein the sensor is arranged in the locking member in such a way that the sensor monitors the position of the locking element and/or of a safety element securing the locking element.

3. The assembly according to claim 1, wherein the sensor is a Hall sensor.

4. The assembly according to claim 1, wherein the electrical setting member is an electrical motor with a gearing downstream.

5. The assembly according to claim 1, wherein the central controller generates test signals by means of which the sensor can be acted upon via an electrical line for testing the function of the locking device.

* * * * *

UNITED STATES PATENT AND TRADEMARK OFFICE
CERTIFICATE OF CORRECTION

PATENT NO.     : 6,400,041 B1
DATED          : June 4, 2002
INVENTOR(S)    : Engelmann et al.

It is certified that error appears in the above-identified patent and that said Letters Patent is hereby corrected as shown below:

<u>Title page,</u>
Item [75], please delete in its entirety and insert:
-- Inventors:    Joachim Engelmann, St. Mavr des Fosses, (FR);
                 Peter Andreas Gratzl, Erdweg, (DE);
                 Hagen Friedrich, Markt Indersdorf, (DE) --.
Item [73], please delete in its entirety, and insert:
-- [73] Assignee: Valeo Deutschland GmbH & Co., Sicherheitssysteme, Erdweg, (DE) --.

Signed and Sealed this

Third Day of June, 2003

JAMES E. ROGAN
*Director of the United States Patent and Trademark Office*